Jan. 17, 1967 L. KLEIN 3,298,157
HOLD-DOWN CLAMP ASSEMBLY
Filed Dec. 2, 1964 2 Sheets-Sheet 1
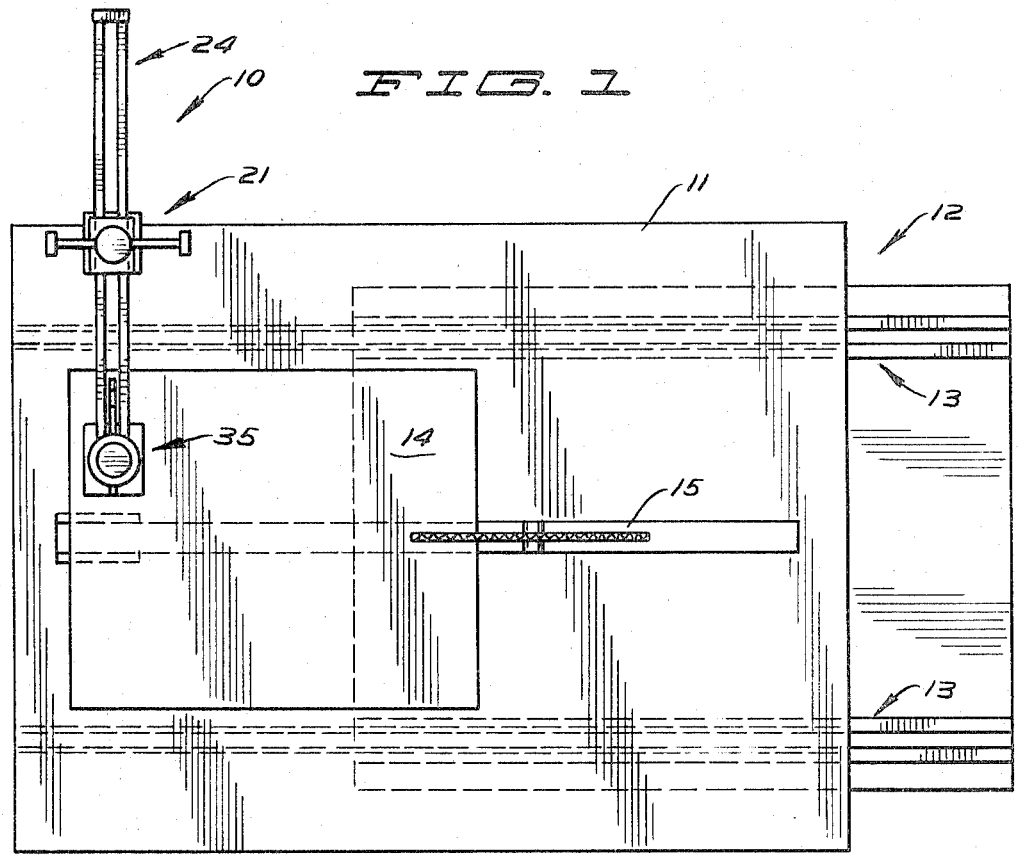
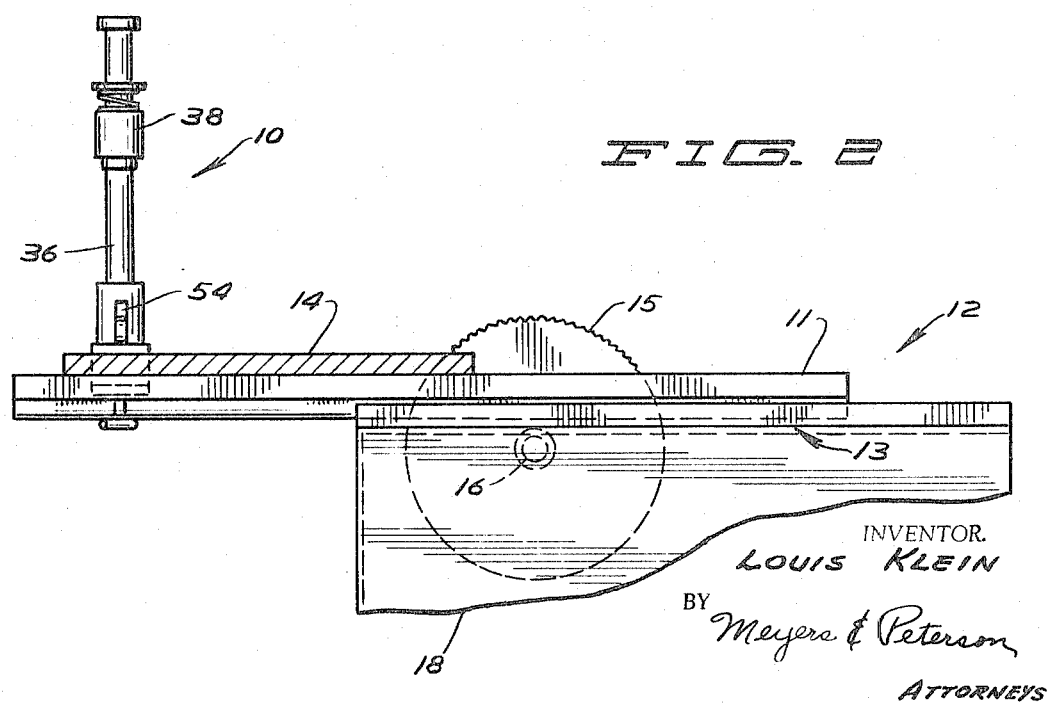
INVENTOR.
LOUIS KLEIN
BY Meyers & Peterson
ATTORNEYS

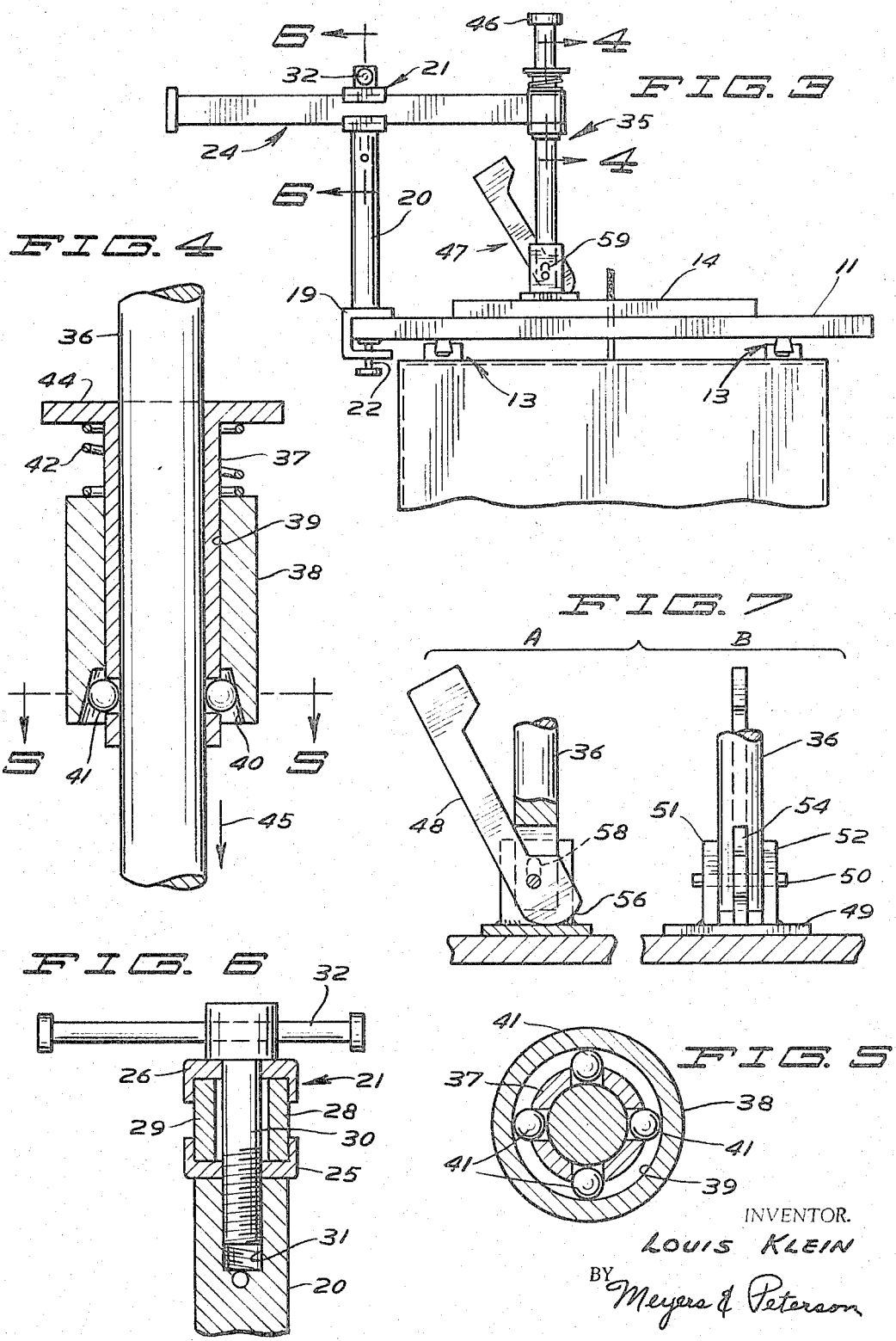

United States Patent Office 3,298,157
Patented Jan. 17, 1967

3,298,157
HOLD-DOWN CLAMP ASSEMBLY
Louis Klein, 569 Sheppard Ave. W., Apt. 102,
Downsview, Ontario, Canada
Filed Dec. 2, 1964, Ser. No. 415,397
12 Claims. (Cl. 53—93)

The present invention relates generally to a device for clamping a workpiece or work in a specific location on a work surface, and holding such workpiece firmly while the said workpiece is being subjected to working forces such as those forces encountered by a workpiece while it is being sawed, drilled, or the like. More particularly, the invention relates to an improved hold-down assembly for firmly and expeditiously holding a workpiece stationary on a working surface while work is being performed.

The present invention provides an improved clamp which may be mounted upon or adjacent to a working surface, such as on or adjacent to a saw table or the like, and, in cooperation with this working surface, the clamp exerts clamping forces upon the workpiece. The clamping forces must exceed those working forces exerted by tools such as circular saws, drill presses, machine tools, hand tools or the like, in order to hold the workpiece stationary.

In power machines, such as saws, drills, including drill presses, and the like, a working surface is usually provided upon which the workpiece rests during the time that the various operations are being performed thereon. The table may be either stationary or movable relative to the tool performing the operation. In either instance, it is generally requisite for both safety and accuracy that the workpiece be firmly clamped in place on the surface of the table. The workpiece may vary in size, shape, and configuration; and also the specific location where the clamp be effectively applied on the workpiece may vary. The operator may attempt to hold the workpiece by hand as he works, or may move it relative to the working surface of the tool, in which case such hand held work is generally less accurate and the operation more dangerous to himself and to those about him. If the cutting tool, such as the saw blade or the drill bit, binds in the workpiece, the workpiece may pull free from the operator's grip and be then at liberty to twist, turn, or move with the cutting tool. This may damage the workpiece, as well as threaten the safety of the operator and those adjacent thereto. Accuracy of the effort applied to the workpiece always suffers when the operator is unable to hold the workpiece firmly to the work surface because the workpiece thereby may become subjected to interacting involuntary movements or shakes therebetween which coarsens the operation.

Various hold-down clamps have been designed in the past in order to hold work securely to a surface. Frequently, these devices are limited in their application to the particular operation inasmuch as they may be adapted to be secured only at specific locations or on a specific type of work surface or adjacent thereto. Other clamps are difficult to apply effectively to varieties of size, shape, and configuration of both workpiece and machinery, and also to repetitive types of operations. In connection with power saws, in particular, the operator may frequently desire to prepare a number of workpieces which are substantially identical, one to another, and hence easy and expeditious working of the clamp relative to the workpiece is a desirable facility for any clamp. The clamp of the present invention is particularly adapted for use in connection with table saws, particularly moving table type saws.

In accordance with the present invention, a hold-down clamp is provided having a mounting portion or assembly which is adapted to firmly engage to a worktable or machine tool table; and also having a workpiece clamping assembly adapted to engage the workpiece and retain it firmly to the table surface. An elongated and adjustable pressure beam extends between the mounting assembly and the clamping assembly. The clamping assembly includes a threadless spindle which is adapted for reciprocal movement within a bearing contact sleeve, this contact sleeve being adapted to form a mean between a gripping block and the threadless spindle. The bearing contact sleeve is provided with a plurality of bearing or pressure applying members which are situated between the interior periphery of an outwardly flared portion of the gripping block and the outer periphery of the threadless spindle. Their function is to bind the gripping block and the threadless spindle into one immovable unit thus forming an infinitely variable quick adjustment without requiring threaded engagment between the components. In order to retain the mechanism in proper disposition in the absence of force being applied thereto, a resilient means is interposed between the gripping block and the bearing contact sleeve in order that the bearing members can be mechanically biased into gentle contact with the outer surface of the threadless spindle. Thus, it is possible to achieve free or substantially unrestrained motion of the spindle in the direction toward the workpiece by merely pressing or urging on the spindle toward the workpiece. Free movement in the other direction is normally restrained by the arrangement; however, this movement can be freely achieved, when desired, by merely depressing the bearing contact sleeve, which relieves the binding action of the bearing members, and then by raising the spindle. Work-containing shoes may be designed, as required, and will normally be capable of being rotated either with or about the axis of the spindle whenever the spindle is not under pressure. Cam means are provided with the shoe in order to apply additional holding pressure after the unit has been placed in contact with the workpiece.

It is therefore a principal object of the present invention to provide an improved apparatus for permitting unidirectional relative movement between a pair of members, the apparatus being particularly adapted for use in a hold-down clamp which may be easily and and expeditiously adjusted to an infinitely variable disposition on the surface of a workpiece in order to securely hold the same at a selected stationary position with respect to the fabricating part of the tool.

It is a further object of the present invention to provide an improved, expeditiously and simply operated hold-down clamp assembly for table saws and other power tools wherein the surface is adapted to move relative to the cutting blade, and wherein the workpiece is adapted to move as one with the table surface.

It is still a further object of the present invention to provide an improved hold-down clamp assembly which is adapted for quick application to the work, and for expeditious removal or separation therefrom.

These and other objects and advantages of the present invention will more fully appear from the following description, made in connection with the accompanying drawings wherein like reference characters refer to the same or similar parts throughout the several views, and in which:

FIGURE 1 is a top plan view of a hold-down assembly fabricated in accordance with the present invention, the hold-down assembly being shown in operative disposition attached to the side rim of the table of a saw having a moving table;

FIGURE 2 is a side elevational view of the arrangement shown in FIGURE 1, certain portions of the saw assembly being shown broken away;

FIGURE 3 is a front elevational view of the arrangement shown in FIGURE 1;

FIGURE 4 is a detail vertical sectional view, on a slightly enlarged scale, taken along the line and in the direction of the arrows 4—4 of FIGURE 3;

FIGURE 5 is a horizontal sectional view taken along the line and in the direction of the arrows 5—5 of FIGURE 4;

FIGURE 6 is a detail vertical sectional view, on a slightly enlarged scale, taken along the line and in the direction of the arrows 6—6 of FIGURE 3; and FIGURES 7A and B are detail elevational views of a hold-down shoe to be used in conjunction with the apparatus of the present invention, the view of FIGURE 7A being partially broken away in order to show greater detail of the features of the device.

In accordance with the preferred modification of the present invention, particular attention is directed to FIGURES 1 and 2 wherein the hold-down means generally designated 10 is shown applied to a movable table 11 of a circular saw assembly generally designated 12, the hold-down means 10 shown clamping the workpiece 14 against the surface of the table 11. A circular saw blade is shown at 15, having an axis of rotation as shown at 16, the blade being driven by a suitable source of power not shown. The saw assembly 12 is further provided with suitable support structure, frame structure, and the like as shown at 13 and 18.

Referring now to the hold-down clamp assembly generally designated 10, it is seen that this apparatus comprises three basic or essential portions: the first being a mounting member for attaching the hold-down means to the work surface; the second being a clamping member for exerting pressure against the workpiece and toward the surface of the table; the last portion being the pressure beam which extends or spans the distance between the mounting member and the work clamping assembly. With particular attention being directed to FIGURE 3 of the drawings, it will be seen that the mounting portion includes a clamping bracket or the like 19 to which is secured a vertical or upright post 20, the opposite end of the post 20 having a clamping head 21 secured thereto. In this connection, the clamping bracket 19 has an open jaw which may be employed as the lower jaw, and which may be threaded in order to receive the screw clamp 22 therein. The clamping head 21 as indicated in FIGURE 3 is secured directly to the post 20.

The pressure beam, generally designated 24, is shown in FIGURE 6 in the form of a pair of elongated rectangular bars or arms 28 and 29 held within the clamping head 21. In this connection, the clamping head 21 includes upper and lower opposed inwardly opening channel forming elements 25 and 26 for receiving arms 28 and 29 of beam 24. A threaded bolt 30 is threadably received within a threaded bore area 31 of the post 20, the head of the screw 30 preferably being provided with a transverse diametrical bore for receiving the elongated torque applying handle or rod 32. Thus, the lower channel member 25 rests on the upper surface of the post 20 together with upper channel 26 and rectangular arms 28 and 29 are free to rotate radially thereon. Pressure exerted by the screw 30 forces the upper channel member 26 into restraining contact with the arms 28 and 29, lower channel 25 and post 20. The individual arms 28 and 29 are adapted to slide or move back and forth in the channel area provided between the channel forming elements 25 and 26 in order to make it possible to extend the clamping apparatus to a desired radial and lateral point along the surface of the work table 11.

Turning now to FIGURES 3 and 4, the clamping member generally designated 35 includes a vertically disposed threadless spindle 36, together with a bearing contact sleeve 37. A gripping block 38 is secured to one end of the pressure beam 24 and has a longitudinal bore into which the bearing contact sleeve 37 is adapted to be slidably received. As indicated, the gripping block 38 has an axial bore designated 39 extending therethrough; the portion disposed toward the work, such as the lower portion in the arrangement shown in FIGURE 4, being provided with a counterbore area including a downwardly and outwardly flaring portion as at 40. A plurality of bearing points in the form of balls 41 are retained in annular cavities within the bearing contact sleeve 37, the balls having a cross sectional thickness or diameter which exceeds the difference between the outer diameter of threadless spindle 36 and the minimum inner diameter of the flared portion 40 of bore 39 in gripping block 38, and which ball diameter is less than the difference between the outer diameter of the threadless spindle and the maximum diameter of the flared portion 40. Thus, in the environment illustrated, the balls 41 provide discrete pressure points whereby radial force may be exerted inwardly against the surface of the spindle 36 by the balls 41, the force being available from contact between the balls and median points along the surface of the tapered or flared portion 40. While three balls are required for minimum stability, smoother action is available if a greater number, such as from about four to six balls, are utilized. In order to retain the balls 41 in a position wherein they will be biased to normally contact both the surface of the spindle 36 and the flared portion 40 of bore 39, a resilient member such as the spring 42 is provided which presses against the underside of collar 44 of the bearing contact sleeve 37. This gentle mechanical bias permits a substantially unrestrained downward spindle movement in the direction shown by the arrow 45 but spindle movement in the opposite direction is resisted and restrained. Upward motion of the spindle, while the balls are in contact with both the surface of the spindle and the surface of the tapered bore area, will cause the balls to become more firmly engaged with the two surfaces and thus restrain further upward motion. Collar 44 further limits the downward travel of the bearing contact sleeve 37, thus preserving the captivity of the balls 41. Restraint against upward spindle movement is relieved by depressing the bearing contact sleeve 37 thereby allowing the balls 41 to occupy unrestricting space at the wider portion of flare 40. To easily apply downward pressure on the threadless spindle 36, and to limit the downward motion, a broad cap 46 is provided at the top free end thereof.

To separate the various components, cap 46 (or fast 47) is removable, permitting the spindle 36 to be pulled through and out of the bore of 37. The balls may then fall inwardly into the bore vacated by the spindle, and the sleeve 37 and be separated from the block 38.

A work hold-down shoe is shown in FIGURES 3 and 7, this assembly being generally designated 47. The hold-down shoe comprises a cam lever member 48, a shoe member 49, and a pin 50 which passes through the spaced-apart upright plates 51 and 52, these plates being secured as indicated to the shoe 49. The spindle 36 is bifurcated as at 54 in order to receive the cam arm 48 therewithin, the cam arm likewise having a hole therein through which the pin 50 passes. The cam surface 56 applies pressure when desired against the shoe 49, and thereby forcing the shoe in a direction away from the beam 24, the shoe being guided by elongated slots such as the slot 58 of the plate 52. This motion will flex the beam 24 in a direction away from the workpiece. A matching slot 59 is, of course, provided in the plate 51.

In operation, it will be appreciated that the operator initially secures the bracket 19 to the edge surface of a work table 11 and by means of clamping head 21 adjusts the pressure beam 24 for proper radial and lateral disposition of the shoe member 49 over the workpiece 14. The screw 30 is then tightened in order to firmly secure the pressure beam relative to the post 20 of the mounting member. Downward pressure is now applied to the cap 46 in order to move the spindle 36 in a direction towards the surface of the workpiece 14 and the shoe 49 into a slidable contact therewith. In order to apply more pressure to the arrangement shown in the drawings herein, the assembly may be grasped, with first and second fingers of the operator being placed on the opposite sides of the spindle 36, and the clamping apparatus slightly tugged upwards, causing the beam 24 to flex; the thumb simultaneously applies pressure on the cap 46, the spindle moving downwards correspondingly to the flexure obtained thereby holding workpiece 14 more tightly. (The above action can be likened to that of operating a syringe.) To obtain additional pressure with the threadless spindle 36, the cam arm 48 is moved to procure depression of shoe member 49 by cam 56 thereby providing additional length to the spindle and in this manner providing additional force against the shoe 49 and forcing it further in a direction against the surface of the workpiece 14. Thus it can be seen that three degrees of pressure are available: a slidable pressure; a firm holding pressure; and an extremely tight pressure. In order to release this tight pressure, the cam arm 48 is merely pivoted towards the foot to relieve spindle 36 firm holding pressure, and the collar 44 of the bearing contact sleeve 37 is simply depressed. This releases the flexural strain in the beam 24, and the spindle 36 is permitted to move upwardly unrestrained in the direction opposite to the arrow 45. It will be appreciated, therefore, that the apparatus provides infinite adjustment, radially, vertically, and laterally; that the hold-down shoe 49 accordingly may be readily positioned at any desired point along the surface of the work, and that three progressively greater degrees of holding pressure are available. If desired, spring means may be disposed within the slots 58 and 59 or adjacent thereto in order to retain the shoe 49 in a position normally removed from the surface of the work. One or more of the hold-down means may be used in connection with any given function or operation.

The shoe 49 is shown to be a planar work-holding surface. If desired, a specifically shaped foot may be designed for holding rods, in which case the foot would have an inverted V configuration; a centering function wherein the foot would have a pointed surface; or a means for holding or guiding moving material in which case the foot would have a roller surface.

The pressure beam 24 provides a cantilever beam action between the mounting member and the clamping apparatus. Thus, any flexure available in the pressure beam 24 will provide the source of continuous pressure which is exerted against the workpiece surface 14 in the clamping apparatus 35.

It will, of course, be understood that various changes may be made in the form, details, arrangements, and proportions of the parts without departing from the scope of the invention as set forth in the appended claims.

What is claimed is:

1. Hold-down means comprising a base mounting member, a work clamping assembly having a work contacting member at one end and a gripping block at the other end thereof, and an elongated pressure beam adjustably extending between said base mounting member and said work clamping assembly, said pressure beam being secured at one end to said base mounting member and to the gripping block at the other end thereof, said gripping block having a bore therein for receiving portions of said clamping assembly, the bore in said gripping block having a downwardly and outwardly flaring portion adjacent to one end thereof, said base mounting member comprising a post having a base clamp at one end and retaining means for slidably receiving said pressure beam at the other end thereof, said work clamping assembly being received within the bore of said gripping block and including a substantially upright spindle having a work contacting shoe at one end thereof, a bearing contact sleeve with an axial bore therein for receiving and enclosing said spindle and disposed as a mean between the inner surface of said bore and the outer surface of said spindle, and a plurality of bearing members being retained within the walls of said bearing contact sleeve, the cross-sectional dimension of the bearing members exceeding the difference between the outer diameter of the spindle and the minimum inner diameter of the outwardly flared portion of the bore formed in the gripping block.

2. The hold-down means as defined in claim 1 being particularly characterized in that said bearing members are spherical.

3. The hold-down means as defined in claim 1 being particularly characterized in that at least three bearing members are utilized.

4. The hold-down means as defined in claim 1 being particularly characterized in that cam means are provided for forcing the work contacting shoe in a direction toward the work.

5. The hold-down means as defined in claim 1 being particularly characterized in that means are provided for releasably clamping the pressure beam to the mounting member.

6. The hold-down means as defined in claim 1 being particularly characterized in that said pressure beam comprises a pair of elongated arms, each arm having a rectangular cross section.

7. The hold-down means as defined in claim 1 being particularly characterized in that the bore in said gripping block has a tapered portion which is divergent in a direction toward the work.

8. Hold-down means comprising a base mounting member, a work clamping assembly, and an elongated radially and longitudinally adjustable pressure beam extending between said base mounting member and said work clamping assembly, said pressure beam being secured along its length to said base mounting member and having a gripping block with a bore therein at the free end thereof for receiving said clamping assembly, the bore in said gripping block having a downwardly and outwardly flaring portion adjacent one end thereof, said mounting member comprising a substantially upright post having a base clamp at one end and retaining means for adjustably receiving and securing said pressure beam along the length of the beam at the other end thereof, said work clamping assembly being received within said gripping block and including an upright spindle having a work contacting shoe at one end, and a bearing contact sleeve with an axial bore therein for receiving and enclosing said spindle and disposed as a mean between the surface of said bore and the surface of said spindle, a plurality of bearing members being retained within the wall of said sleeve and being normally disposed adjacent to the flare portion of said bore, the cross-sectional dimension of the bearing members exceeding the difference between the outer diameter of the spindle and the minimum inner diameter of the bore formed in the gripping block, and resilient biasing means for forcing said sleeve into the bore of said gripping block in a direction whereby the said bearing members are forced further into said tapered bore area and into contact with the surface of said spindle.

9. The hold-down means as defined in claim 8 being particularly characterized in that said bearing contact sleeve is adapted to be depressed to move the spherical bearings further into the downwardly and outwardly tapered flared zone, thereby relieving the binding action of the gripping block.

10. In means for permitting unidirectional relative movement between a spindle and a block disposed in circumscribing relationship thereto, a spindle, a block having a bore therein and being disposed in circumscribing relationship to said spindle, the bore having an outwardly flared zone adjacent one end thereof, a floating bearing contact sleeve disposed within said bore between the inner surface of said block and the outer surface of said spindle, at least three bearing members retained within said sleeve and adapted to contact the surface of said spindle and the surface of said bore, the cross-sectional dimensions of said bearing members exceeding the difference between the outer diameter of said spindle and the minimum inner diameter of said bore.

11. The apparatus as defined in claim 10 and being particularly characterized in that resilient biasing means are provided to force said sleeve into the bore of block in a first direction whereby the said bearing members are forced further into said tapered bore area and into closer contact with the surface of said spindle.

12. The apparatus as defined in claim 11 being particularly characterized in that release means are provided for applying a force to said sleeve to move said sleeve in a direction opposite to said first direction whereby said bearing members will be moved toward the outer flared portion of said tapered bore and out of pressure contact with the surface of said spindle.

No references cited.

RICHARD H. EANES, JR., *Primary Examiner.*